United States Patent
Liu et al.

(10) Patent No.: US 10,274,604 B1
(45) Date of Patent: Apr. 30, 2019

(54) SYSTEM, DEVICE, AND METHOD OF PRIORITIZING GENERATION OF PREDICTED EPHEMERIS DATA

(71) Applicant: Marvell International Ltd., Hamilton (BM)

(72) Inventors: BoChih Liu, Shanghai (CN); Zhike Jia, Fremont, CA (US); Jinfeng Liu, Shanghai (CN); Zhicui Lu, Shanghai (CN); Juhong Xing, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 361 days.

(21) Appl. No.: 15/295,295

(22) Filed: Oct. 17, 2016

Related U.S. Application Data

(60) Provisional application No. 62/258,659, filed on Nov. 23, 2015.

(51) Int. Cl.
*G01S 19/27* (2010.01)

(52) U.S. Cl.
CPC .................. *G01S 19/27* (2013.01)

(58) Field of Classification Search
CPC ........... G01S 19/03; G01S 19/09; G01S 19/27
USPC .............. 342/357.4, 357.46, 357.66, 357.67; 701/468, 531
See application file for complete search history.

(56) References Cited

U.S. PATENT DOCUMENTS

| | | | | |
|---|---|---|---|---|
| 2009/0237302 A1* | 9/2009 | Derbez | ................... | G01S 19/05 342/357.66 |
| 2009/0295630 A1* | 12/2009 | Wengler | .................. | G01S 19/05 342/357.29 |
| 2010/0194634 A1* | 8/2010 | Biacs | ...................... | G01S 19/23 342/357.31 |

\* cited by examiner

*Primary Examiner* — Dao L Phan

(57) ABSTRACT

Aspects of the disclosure include a method of prioritizing generation of predicted ephemeris data. The method includes receiving, by a device through a data network, first ephemeris seed data of a subset of a plurality of satellites, identifying a first satellite and a second satellite of the plurality of satellites, the first satellite being potentially detectable by the device at an estimated position at a given time, and the second satellite being potentially undetectable by the device at the estimated position at the given time, and prioritizing generation of first predicted ephemeris data that represent a first orbit of the first satellite before generation of second predicted ephemeris data that represent a second orbit of the second satellite. The generation of the first predicted ephemeris is based on the first ephemeris seed data.

20 Claims, 8 Drawing Sheets

SYSTEM, DEVICE, AND METHOD OF PRIORITIZING GENERATION OF PREDICTED EPHEMERIS DATA

INCORPORATION BY REFERENCE

This present disclosure claims the benefit of U.S. Provisional Application No. 62/258,659, "Partial Satellite Ephemeris Predication Positioning Method and Device for Global Navigation Satellite System Receiver" filed on Nov. 23, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a satellite-based positioning system (sometimes also referred to as a Global Navigation Satellite System (GNSS)), such as the U.S. Global Positioning System (GPS), the Russian GLObal NAvigation Satellite System (GLONASS), the European Galileo Navigation System (GALILEO), or the Chinese BeiDou-2 Navigation System (BDS), each active satellite within a satellite constellation broadcasts information including almanac data of the entire satellite constellation and ephemeris data of the broadcasting satellite. Almanac data are usable for determining rough positions of all satellites in the system. Ephemeris data are usable for determining a more accurate position of the broadcasting satellite than the corresponding rough position determined based on the almanac data. A position aware device, such as a satellite positioning receiver, can determine its position based on navigation signals received from various satellites and the positions of these satellites.

Moreover, an indicator of the performance of a position aware device is the Time-to-First-Fix (TTFF). The TTFF measures how long it takes a position aware device to provide an estimated position after the positioning functionality is activated. In some applications, the TTFF depends on many factors, including how long the position aware device takes to obtain the suitable almanac data and ephemeris data. However, receiving a complete set of almanac data and ephemeris data from a satellite is usually a time consuming task and susceptible to transmission losses caused by the atmosphere and/or obstructions. In an example, it takes a GPS receiver at least 30 seconds to receive one GPS message frame from a satellite, which includes a complete set of the ephemeris data and only 1/25 of a complete set of the almanac data.

SUMMARY

This disclosure relates generally to a system or a device for, or a method of, prioritizing generation of predicted ephemeris data. Aspects of the disclosure provide a method of prioritizing generation of predicted ephemeris data. The method includes receiving, by a device through a data network, first ephemeris seed data of a subset of a plurality of satellites; identifying a first satellite and a second satellite of the plurality of satellites, the first satellite being potentially detectable by the device at an estimated position at a given time, and the second satellite being potentially undetectable by the device at the estimated position at the given time; and prioritizing generation of first predicted ephemeris data that represent a first orbit of the first satellite before generation of second predicted ephemeris data that represent a second orbit of the second satellite. The generation of the first predicted ephemeris is based on the first ephemeris seed data.

In an embodiment, the generation of the second predicted ephemeris data is based on the first ephemeris seed data.

In an embodiment, the method includes, after the generation of the first predicted ephemeris data, receiving second ephemeris seed data of the second satellite. The generation of the second predicted ephemeris data is based on the second ephemeris seed data.

In an embodiment, identifying the first satellite and the second satellite includes determining the estimated position based on routing information of the device in the data network; and identifying a set of potentially detectable satellites detectable by the device at the estimated position at the given time according to almanac data of the plurality of satellites.

In an embodiment, identifying the set of potentially detectable satellites includes identifying, among the plurality of satellites based on the estimated position and the almanac data, satellites that have elevation angles greater than a predetermined positive threshold as the set of potentially detectable satellites.

In an embodiment, the method further includes receiving information indicating a set of potentially detectable satellites from a server outside the device. Identifying the first satellite and the second satellite is performed based on the information indicating the set of potentially detectable satellites. In an embodiment, identifying the first satellite and the second satellite includes identifying from the first ephemeris seed data the subset of the plurality of satellites as a set of potentially detectable satellites.

Aspects of the disclosure provide a device that includes a communication interface, and a processor. The communication interface is communicatively coupled to a network and is configured to receive first ephemeris seed data of a subset of a plurality of satellites via the network. The processor configured to identify a first satellite and a second satellite of the plurality of satellites, the first satellite being potentially detectable by the device at an estimated position at a given time, and the second satellite being potentially undetectable by the device at the estimated position at the given time, and prioritize generation of first predicted ephemeris data that represent a first orbit of the first satellite before generation of second predicted ephemeris data that represent a second orbit of the second satellite. The generation of the first predicted ephemeris is based on the first ephemeris seed data.

In an embodiment, the generation of the second predicted ephemeris data is based on the first ephemeris seed data.

In an embodiment, the communication interface is further configured to, after the generation of the first predicted ephemeris data, receive second ephemeris seed data of the second satellite. The generation of the second predicted ephemeris data is based on the second ephemeris seed data.

Aspects of the disclosure provide a system that includes a server configured to store first ephemeris seed data of a subset of a plurality of satellites, a data network, and a device communicatively coupled with the server through the data network. The device is configured to receive first ephemeris seed data from the server via the data network, identify a first satellite and a second satellite of the plurality of satellites, the first satellite being potentially detectable at an estimated position at a given time, and the second satellite being potentially undetectable by the device at the estimated position at the given time, and prioritize generation of first predicted ephemeris data that represent a first orbit of the first satellite before generation of second predicted ephemeris data that represent a second orbit of the second satellite. The generation of the first predicted ephemeris is based on the first ephemeris seed data.

In an embodiment, the generation of the second predicted ephemeris data is based on the first ephemeris seed data.

In an embodiment, the server is further configured to store second ephemeris seed data of the second satellite; and the device is further configured to receive the second ephemeris seed data after the generation of the first predicted ephemeris. The generation of the second predicted ephemeris data is based on the second ephemeris seed data.

In an embodiment, when identifying the first satellite and the second satellite, the device is further configured to determine the estimated position based on routing information of the device in the data network, and identify a set of potentially detectable satellites detectable by the device at the estimated position at the given time according to almanac data of the plurality of satellites.

In an embodiment, the server is further configured to determine the estimated position based on routing information of the device in the data network, and identify a set of potentially detectable satellites detectable by the device at the estimated position at the given time according to almanac data of the plurality of satellites.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
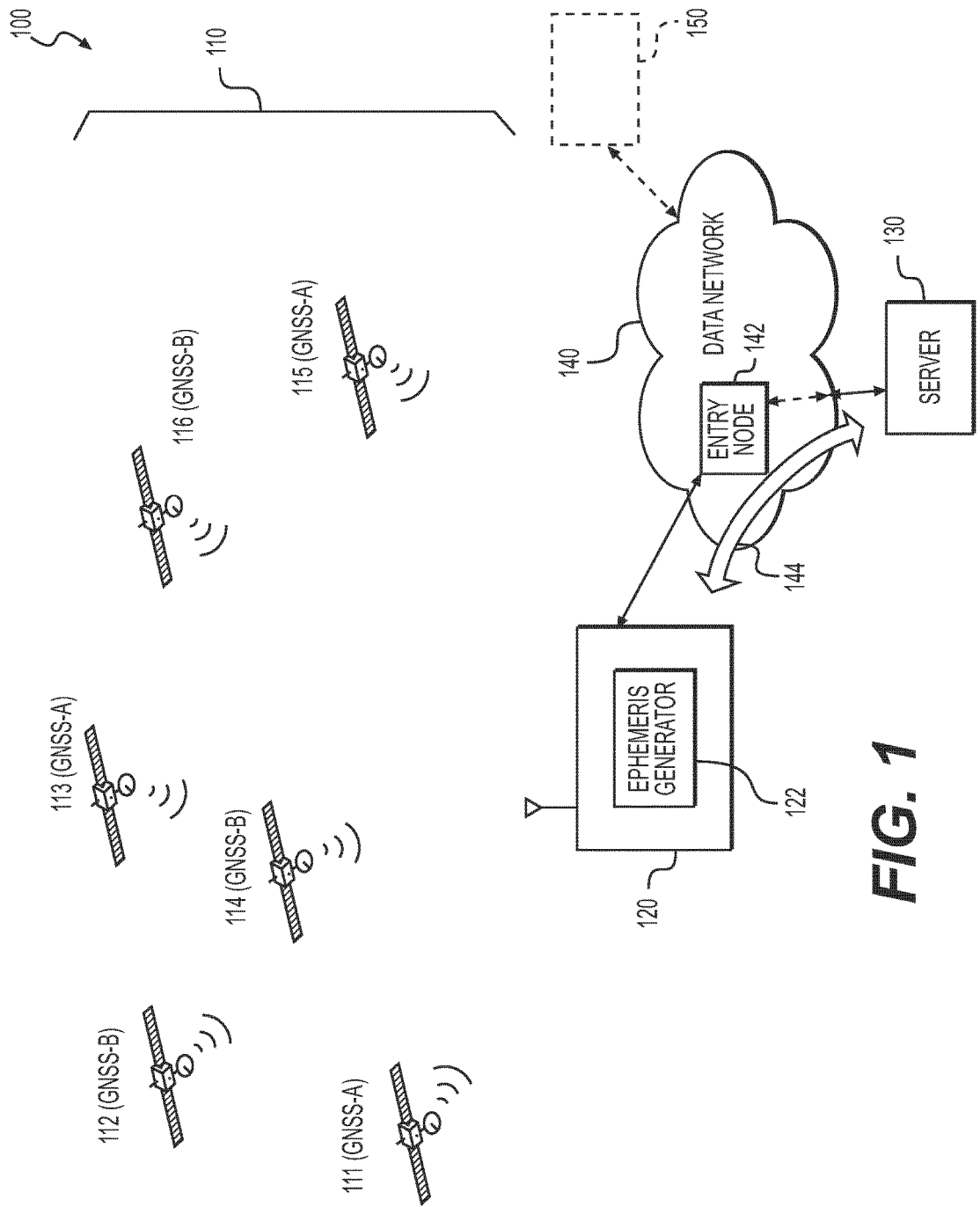
FIG. 1 shows a diagram of an example positioning system according to an embodiment of the disclosure.

FIG. 1 shows a diagram of an example positioning system 100 according to an embodiment of the disclosure. The positioning system 100 includes a plurality of satellites 110, a position aware device 120, a server 130, a data network 140 communicatively coupling the position aware device 120 and the server 130, and one or more other devices 150 communicatively coupled with the data network 140.

Six satellites 111-116 (collectively referred to as satellites 110) are potentially detectable by the position aware device 120. Satellites 111, 113, and 115 are part of the satellite constellation of a first type GNSS (labeled as GNSS-A in FIG. 1), and satellites 112, 114, and 116 are part of the satellite constellation of a second type GNSS (labeled as GNSS-B in FIG. 1). In some examples, each of the GNSS-A and GNSS-B corresponds to a satellite-based positioning system in compliance with the GPS, GLONASS, GALILEO, BDS, or the like. For example, GNSS-A belongs to a satellite-based positioning system in compliance with the GPS standard, and satellites 111, 113, and 115 are three satellites among the entire GPS satellite constellation, which includes 32 satellites. Also, for example, GNSS-B belongs to a satellite-based positioning system in compliance with the GLONASS standard, and satellites 112, 114, and 116 are three satellites among the entire GLONASS satellite constellation which includes 24 satellites.

Only one other device 150 and six satellites 110 are depicted in FIG. 1 as an example. Of course in other examples, a positioning system 100 can include additional devices 150 and satellites 110 than those shown in the example of FIG. 1.

Each of the satellites 110 orbits the Earth and broadcasts navigation messages toward the surface of the Earth. The position aware device 120 receives the broadcasted navigation messages and determines a position of the position aware device 120 according to the broadcasted navigation messages. In some examples, the broadcasted navigation messages include navigation data and ranging codes in compliance with one or more predetermined satellite positioning system standards, such as GPS, GLONASS, GALILEO, BDS, or the like. In some examples, the navigation data include ephemeris data applicable to the transmitting satellite, almanac data applicable to the entire satellite constellation of a corresponding GNSS standard, and/or time information indicating a transmitting time of a particular data frame or sub-frame that carries the time information. In some examples, the position aware device 120 retrieves, from the server 130 and/or the other device 150, a portion or all of the navigation data that are needed to determine the current position of the position aware device 120 through the data network 140.

The position aware device 120 can be any mobile device that is configured to determine a position of the mobile device based on navigation signals received from the satellites 110. For example, the position aware device 120 can be a laptop computer, tablet computer, smart phone, wearable electronic device, camera, electronic device installable on a vehicle, and the like. In some examples, the position aware device 120 is compatible with two or more of the various satellite positioning system standards. In other examples, the position aware device 120 is compatible with only one of various satellite positioning system standards.

As shown, the position aware device 120 includes an ephemeris generator 122. In some examples, the position aware device 120 retrieves ephemeris seed data from the server 130, and the ephemeris generator 122 is capable of generating predicted ephemeris data for any satellite in the entire satellite constellation of the system 100 based on the ephemeris seed data. In many applications, broadcasted ephemeris data, either received directly from the satellites 110 or indirectly from the server 130 or the other device 150, are usually valid for less than four hours. In contrast, predicted ephemeris data generated based on the ephemeris seed data are usually valid for a much longer period of time, such as several days or even several weeks.

In some examples, the predicted ephemeris data is generated based on a set of predetermined satellite equations of motion, and the set of the ephemeris seed data includes parameters for the set of equations applicable to one or more of the satellites in a corresponding satellite constellation. In some examples, the ephemeris seed data includes earth orientation parameter (EOP) data and/or other parameters provided by the International Earth Rotation and Reference System Service (IERS) or the National Geospatial-Intelligence Agency (NGA).

Moreover, in some examples, the ephemeris generator 122 of the position aware device 120 is further configured to prioritize generation of predicted ephemeris data of a potentially detectable satellite before generation of predicted ephemeris data of a potentially undetectable satellite. According to some embodiments of the present disclosure, the ephemeris generator 122 performs generation of the predicted ephemeris data of the potentially detectable satellites that are usable to determine a current position of the position aware device 120, and defers generation of the predicted ephemeris data of the potentially undetectable satellites. As such, the computational resources and/or the power consumption of the position aware device 120 are spent on the tasks that are relevant to optimization of the TTFF.

A satellite is detectable by the position aware device 120 when the navigation data broadcasted by the satellite are receivable by the position aware device 120. A satellite is undetectable by the position aware device 120 when the navigation data broadcasted by the satellite are not receivable by the position aware device 120. In many applications, the carrier frequencies for transmitting the navigation data may be at a frequency band that such transmission is usually carried out by line-of-sight propagation. Therefore, in some examples, whether a satellite is potentially detectable by the position aware device 120 is determined based on whether a straight line that connects such satellite and the position aware device 120 is free of obstruction of the Earth. A satellite may be determined as potentially detectable at a position when a straight line therebetween is free of obstruction of the Earth; and a satellite may be determined as potentially undetectable at a position when a straight line therebetween is obstructed by the Earth.

The server 130 stores ephemeris seed data on which the generation of corresponding predicted ephemeris data is based. In some examples, the server 130 or the other device 150 stores almanac data, ephemeris data, or other system information. In some examples, the server 130 or the other device 150 also stores position information of one or more hardware nodes in the data network 140.

The data network 140 includes a hardware device that functions as an entry node 142 for the position aware device 120 to access the server 130 and/or the other device 150 through the data network 140. Routing information 144, recorded in the data network 140 and/or data packets exchanged between the position aware device 120 and the server 130, indicates a set of communication paths through the data network 140. In some examples, the routing information 144 identifies the entry node 142 for the position aware device 120. In some examples, a known position of the entry node 142 is usable to determine an estimated position of the position aware device 120.

The data network 140 includes one or a combination of various types of data network. In some examples, the data network 140 includes a wireless data network according to a wireless communication protocol, such as Global System for Mobile communication (GSM), Code Division Multiple Access (CDMA), Wideband Code Division Multiple Access (WCDMA), Time Division Synchronous Code Division Multiple Access (TD-SCDMA), Long Term Evolution (LTE), Time Division Long Term Evolution (TD-LTE); Institute of Electrical and Electronics Engineers (IEEE) 802.11 based protocol, IEEE 802.15 based protocol, and the like. In some examples, the data network 140 includes a wired network according to a wired communication protocol, such as ETHERNET, Universal Serial Bus (USB), IEEE-1394, and the like. In some examples, the entry node 142 is an access point, or a base station, or the like, of a wireless network; or a router, switch, bridge, or modem, or the like of a wired network.

In operation, the ephemeris generator 122 of the position aware device 120 determines an estimated position of the position aware device 120, based on the known position of the entry node 142 stored in the server 130 or the other device 150, a stored last known position of the position aware device 120, detection results of one or more sensors of the position aware device 120, or a combination thereof. In some examples, the ephemeris generator 122 identifies potentially detectable satellites 111, 113, and 115 at the estimated position at a given time based on valid almanac data of the entire satellite constellation of GNSS-A, or potentially detectable satellites 112, 114, and 114 based on valid almanac data of the entire satellite constellation of GNSS-B, or both if the position aware device 120 is compatible with both GNSS-A and GNSS-B standards. Also, by determining the detectable satellites, the ephemeris generator 122 also identifies the undetectable satellites (not shown) in the corresponding satellite constellation.

After identifying one or more detectable satellites and one or more undetectable satellites, the ephemeris generator 122 of the position aware device 120 prioritizes the generation of predicted ephemeris data for detectable satellites 111-116 before the generation of predicted ephemeris data for undetectable satellites. The generation of the predicted ephemeris data is performed based on ephemeris seed data received from the server 130. In some examples, in response to a request from the position aware device 120, the server 130 transmits all the ephemeris seed data for the applicable GNSS satellite constellation. In some examples, in response to a request from the position aware device 120, the server 130 transmits only the ephemeris seed data for the satellites identified in the request.

In at least one example, the server 130 determines an estimated position of the position aware device 120 based on the known position of the entry node 142 and identifies potentially detectable satellites 111, 113, and 115 based on valid almanac data of the entire satellite constellation of GNSS-A, or potentially detectable satellites 112, 114, and 114 based on valid almanac data of the entire satellite constellation of GNSS-B, or both. The server 130 then transmits information indicating the identified potentially detectable satellites to the position aware device 120, either by transmitting only the ephemeris seed data for the potentially detectable satellites or by a separate list of identification information of the potentially detectable satellites.

When the information regarding estimated position of the position aware device 120 and/or the potentially detectable satellites are unavailable, the position aware device 120 generates the predicted ephemeris data for the entire satellite constellation of the suitable GNSS standard(s).

Figure 2:
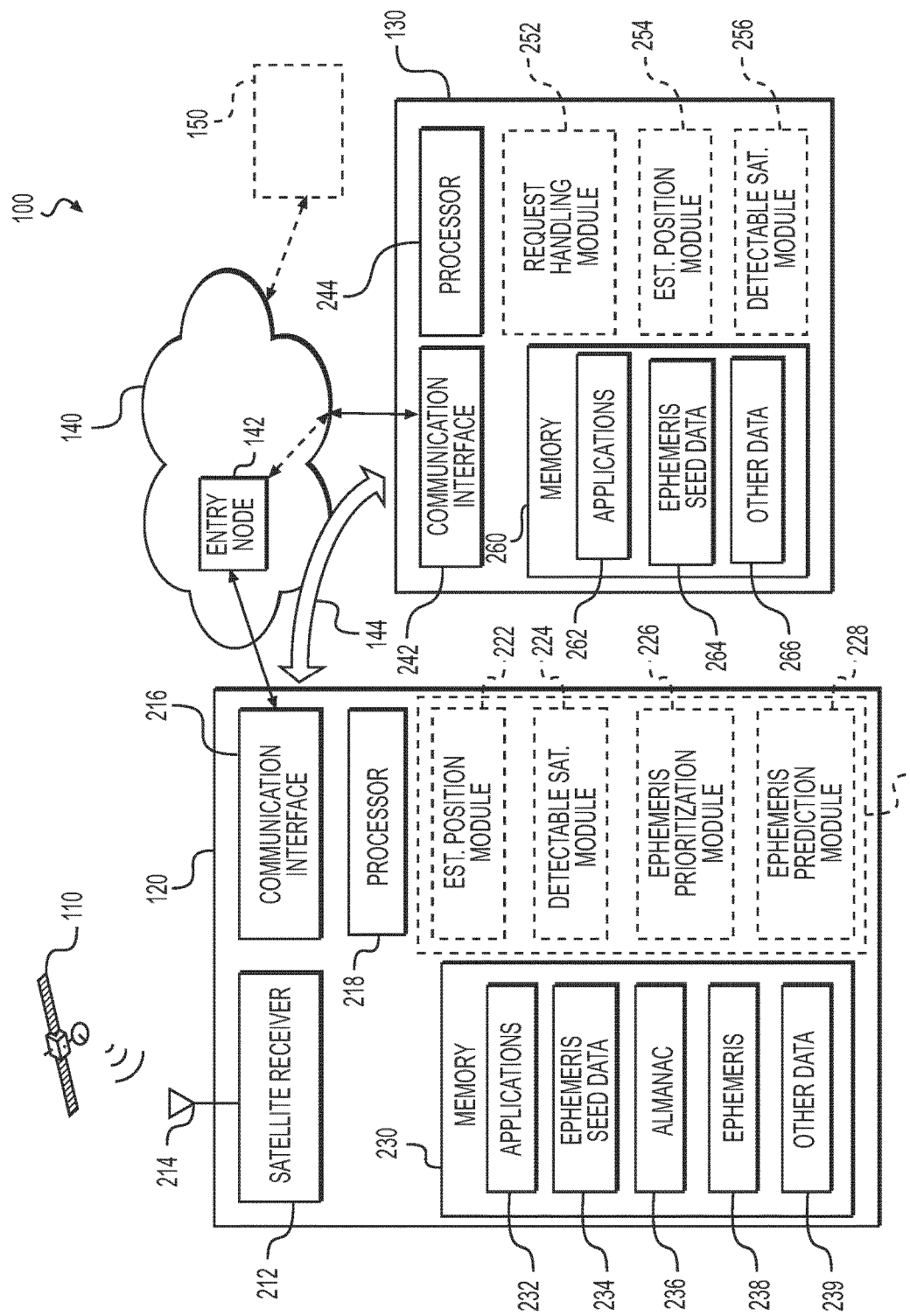
FIG. 2 shows a functional block diagram of the example positioning system in FIG. 1 according to an embodiment of the disclosure.

FIG. 2 shows a functional block diagram of the example positioning system 100 according to an embodiment of the disclosure. Components in FIG. 2 that are the same or similar to the components in FIG. 1 are given the same reference numbers, and detailed description thereof is omitted.

As shown, the position aware device 120 can include a satellite receiver 212, an antenna 214 electrically coupled with the satellite receiver 212, a communication interface 216 communicatively coupled with the data network 140. The position aware device 120 also may include a processor 218, a memory 230, and the ephemeris generator 122. The ephemeris generator 122 includes an estimated position determination module 222, a detectable satellite determination module 224, an ephemeris prioritization module 226, and an ephemeris prediction module 228.

The satellite receiver 212 is configured to receive the navigation messages from the satellites 110 through the antenna 214. The communication interface 216 is configured to exchange data with the server 130 and/or the other device 150 through the data network 140.

The processor 218 is configured to execute an operating system and various client applications to perform various functions. The processor 218 can include a single or multiple processing cores. In some examples, the processor 218 executes instructions to function as one or more of the estimated position determination module 222, detectable satellite determination module 224, ephemeris prioritization module 226, and ephemeris prediction module 228 of the ephemeris generator 122.

The estimated position determination module 222 is configured to determine an estimated position of the position aware device 120. In some examples, the estimated position determination module 222 determines the estimated position based on the routing information 144. For example, the estimated position determination module 222 identifies the entry node 142 (e.g., a base station or a router) and looks up in the memory 230, the server 130, or the other device 150 for a stored position of the entry node 142. In some examples, the estimated position determination module 222 uses the stored position of the entry node 142 as the estimated position of the position aware device 120.

In some examples, the estimated position determination module 222 determines the estimated position of the position aware device 120 based on a stored, last-known position of the position aware device 120 and the detection results from one or more movement sensors (not shown) of the position aware device 120, such as accelerometers, gyroscope, compass, or the like. In some examples, the estimated position determination module 222 uses the stored, last-known position of the position aware device 120 as the estimated position when identification information of the entry node 142 matches a stored, last-known entry node associated with the stored, last-known position. Other approaches or variations of determining the estimated position of the position aware device 120 is within the scope of the present disclosure.

The detectable satellite determination module 224 is configured to identify, based on valid almanac data of one or more corresponding GNSS satellite constellations, one or more satellites that are potentially detectable at the estimated position at a given time, such as a current time or a later time when the position information of the position aware device 120 would be needed by an application. Moreover, based on the valid almanac data and the identified potentially detectable satellites, one or more potentially undetectable satellites within the entire satellite constellation are also explicitly or implicitly identified. In some examples, the valid almanac data are received from the satellites 110. In some examples, the valid almanac data are received from the server 130 or the other device 150.

The detectable satellite determination module 224 can identify satellites that have elevation angles greater than a predetermined positive threshold as potentially detectable satellites from among the satellites of the corresponding GNSS satellite constellation(s) based on the estimated position and the almanac data. In some examples, the predetermined positive threshold ranges from 0 to 10 degrees. For example, the predetermined positive threshold can be set at 5 degrees.

The server 130 can identify a set of potentially detectable satellites and provide such information by sending the position aware device 120 only the ephemeris seed data corresponding to the set of potentially detectable satellites or in the form of a separate list of identification information of satellites. In some examples, the detectable satellite determination module 224 identifies potentially detectable or undetectable satellites based on the list of identification information of the set of potentially detectable satellites provide by the server 130 or identifying from the received ephemeris seed data the set of potentially detectable satellites.

The position aware device 120 does not need to determine the estimated position thereof when the detectable satellites are identified based on the information provided by the server 140, and the estimated position determination module 222 can be omitted.

The ephemeris prioritization module 226 is configured to prioritize generation of predicted ephemeris data of satellites. For example, the detectable satellite determination module 224 identifies a first satellite as potentially detectable at the estimated position at the given time and a second satellite as potentially undetectable at the estimated position at the given time. The ephemeris prioritization module 226 prioritizes the generation of first predicted ephemeris data that represent a first orbit of the first satellite before the generation of second predicted ephemeris data that represent a second orbit of the second satellite. In some examples, the ephemeris prioritization module 226 also checks the memory 230 to determine whether an updated predicted ephemeris data would be needed for a satellite or whether corresponding valid ephemeris data for the satellite is already available, and prioritize the generation of predicted ephemeris data only for those satellites that need updated ephemeris data and without valid, received ephemeris data.

The ephemeris prediction module 228 is configured to generate predicted ephemeris data based on ephemeris seed data received from the server 130. In some examples, the server 130 transmits ephemeris seed data for the entire satellite constellation of an applicable GNSS, and the ephemeris prediction module 228 generates the predicted ephemeris data according to the prioritization arranged by the ephemeris prioritization module 226. In some examples, the predicted ephemeris data for potentially detectable satellites are generated prior to determining a position of the position aware device 120 for the first time after the positioning functionality of the position aware device 120 is activated. In some examples, the predicted ephemeris data for potentially undetectable satellites are generated after determining the position of the position aware device 120 for the first time after the positioning functionality of the position aware device 120 is activated. In some examples, the generation of the predicted ephemeris data for potentially detectable satellites has higher priority with respect to obtaining computational resources of the position aware device 120. In some examples, the generation of the predicted ephemeris data for potentially undetectable satellites has lower priority with respect to obtaining computational resources of the position aware device 120, processed as a background process, or processed only when the positioning functionality of the position aware device 120 is deactivated.

In some examples, one or more of the various modules of the ephemeris generator 122 described in the present disclosure are implemented as software instructions executed by the processor 218. In some examples, one or more of the various modules of the ephemeris generator 122 described in the present disclosure are implemented as circuitry.

The memory 230 is used to store an operating system (not shown), client applications 232, ephemeris seed data 234 received from the server 240, almanac data 236 received from the satellites 110 or the server 130, ephemeris data 238 received from the satellites 110 or the server 130 or generated based on the ephemeris seed data 234, and/or other data, intermediate data, or software programs 239. In some examples, the memory 230 includes a non-transitory computer readable medium, such as a semiconductor or solid-state memory, a random access memory (RAM), a read-only memory (ROM), a hard disk, an optical disk, or other suitable storage medium. In some embodiments, the memory 230 includes a combination of two or more of the non-transitory computer readable mediums listed above.

The server 130 is configured to store the ephemeris seed data, receive a request for ephemeris seed data from the position aware device 120, and to transmit the ephemeris seed data for a subset or all the satellites in the entire satellite constellation to the position aware device 120 in response to the request.

As shown, the server 130 includes a communication interface 242 communicatively coupled with the data network 140, a processor 244, a memory 260, and one or more modules such as a request handling module 252, an estimated position determination module 254, and a detectable satellite determination module 256.

The communication interface 242 is configured to exchange data with the position aware device 120 and/or the other device 150 through the data network 140. The processor 244 can include a single or multiple processing cores. The processor 244 is configured to execute an operating system and various server applications to perform various functions. In some examples, the processor 244 executes instructions to function as one or more of the request handling module 252, estimated position determination module 254, and detectable satellite determination module 256.

The request handling module 252 is configured to receive via the communication interface 242 a request for ephemeris seed data from the position aware device 120. In some examples, the request handling module 252 transmits via the communication interface 242 the ephemeris seed data for all the satellites in the entire satellite constellation to position aware device 120 in response to the request. In some examples, the request handling module 252 also transmits via the communication interface 242 the estimated position of the position aware device 120 determined by the estimated position determination module 254.

In some examples, the request handling module 252 provides the information regarding a set of detectable satellites identified by the detectable satellite determination module 256. In some examples, the request handling module 252 transmits a list of identification information of detectable satellites identified by the detectable satellite determination module 256. The request handling module 252 may include the information regarding detectable satellites in the ephemeris seed data. For example, the request handling module 252 transmits the ephemeris seed data for the detectable satellites when the request from the position aware device 120 is a request before the position aware device 120 determines a position for the first time after the positioning functionality of the position aware device 120 is activated. The request handling module 252 transmits the ephemeris seed data for the undetectable satellites when the request from the position aware device 120 is a request after the position aware device 120 determines the position for the first time after the positioning functionality of the position aware device 120 is activated.

The estimated position determination module 254 is configured to determine an estimated position of the position aware device 120. In some examples, the estimated position determination module 154 determines the estimated position based on the routing information 144 in a manner similar to the operation of the estimated position determination module 222. Detailed description of the estimated position determination module 254 is thus omitted.

The detectable satellite determination module 256 is configured to identify, based on valid almanac data, one or more satellites that are potentially detectable at the estimated position at a given time in a manner similar to the operation of the detectable satellite determination module 224. Detailed description of the detectable satellite determination module 256 is thus omitted. In some examples, the valid almanac data are received by the server 130 from the satellites 110. In some examples, the valid almanac data are received from the other device 150 through the data network 140.

In some examples, when the request handling module 252 is not configured to transmit information regarding the estimated position of the position aware device 120, the estimated position determination module 254 is omitted. In some examples, when the request handling module 252 is not configured to transmit information regarding the detectable satellites as identified by the server 130, the detectable satellite determination module 256 is omitted.

In some examples, one or more of the various modules of the server 130 described in the present disclosure are implemented as software instructions executed by the processor 244. In some examples, one or more of the various modules of the server 130 described in the present disclosure are implemented as circuitry.

The memory 260 is used to store an operating system (not shown), server applications 262, ephemeris seed data 264 received from the other device 150, and/or almanac data, ephemeris data, stored known positions of various entry nodes, other data, intermediate data, or software programs 266. In some examples, the memory 260 includes a non-transitory computer readable medium, such as a semiconductor or solid-state memory, a RAM, a ROM, a hard disk, an optical disk, or other suitable storage medium. In some embodiments, the memory 260 includes a combination of two or more of the non-transitory computer readable mediums listed above.

Figure 3:
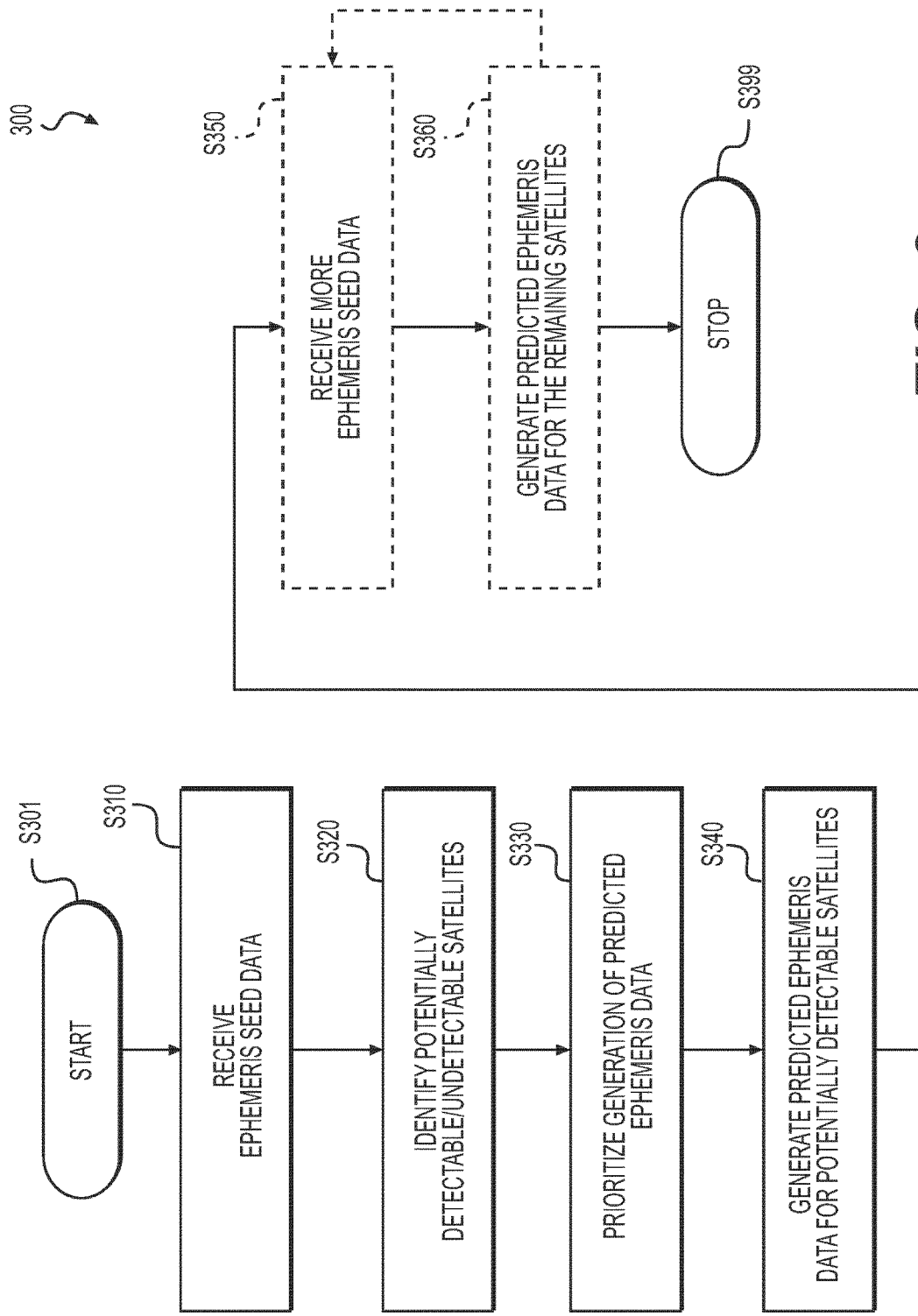
FIG. 3 shows a flow chart outlining an example process of generating predicted ephemeris data by the position aware device in FIG. 2 according to an embodiment of the disclosure.

FIG. 3 shows a flow chart outlining an example process 300 of generating predicted ephemeris data by a position aware device, such as the position aware device 120 in FIG. 2, according to an embodiment of the disclosure. It is understood that additional operations may be performed before, during, and/or after the process 300 depicted in FIG. 3. The process 300 starts at S301 and proceeds to S310.

At S310, a set of ephemeris seed data is received. In some examples, the set of ephemeris seed data is for an entire satellite constellation of one or more predetermined GNSS standards. In some examples, the set of ephemeris seed data is for a subset of the entire satellite constellation.

For example, the communication interface 216 of the position aware device 120 receives from the server 130 through the data network 140 a set of ephemeris seed data. In some examples, the position aware device 120 stores the received set of ephemeris seed data in the memory 230. In some examples, when the position aware device 120 is powered up or begins to execute an application that requires position information, or the positioning functionality of the position aware device 120 is activated, the position aware device 120 checks the validity of the previously received ephemeris seed data and only requests the server 130 for updated ephemeris seed data if the previously received ephemeris seed data become invalid. In some examples, when the position aware device 120 is powered up or begins to execute the application that requires position information, or the positioning functionality of the position aware device 120 is activated, the position aware device 120 requests the server 130 for updated ephemeris seed data anyway.

At S320, one or more satellites that are potentially detectable and one or more satellites that are potentially undetectable at an estimated position at a given time are identified. In some examples, S320 includes determining the estimated position and identifying the potentially detectable or undetectable satellites based on the estimated position and valid almanac data. In some examples, S320 includes identifying the potentially detectable or undetectable satellites based on information regarding potentially detectable satellites as identified by an external device.

For example, the estimated position determination module 222 of the position aware device 120 determines the estimated position based on the routing information 144, and then the detectable satellite determination module 224 of the position aware device 120 determines the potentially detectable and undetectable satellites based on the estimated position and valid almanac data. In some examples, the detectable satellite determination module 224 extract the information indicating the potentially detectable satellites identified by the server 130 and determines the detectable and undetectable satellites accordingly.

At S330, generation of predicted ephemeris data for the detectable and undetectable satellites is prioritized. In some examples, the generation of the predicted ephemeris data that represent an orbit of a potentially detectable satellite is to be performed before the generation of the predicted ephemeris data that represent an orbit of a potentially undetectable satellite.

For example, the ephemeris prioritization module 226 of the position aware device 120 prioritizes the generation of identified potentially detectable and undetectable satellites. In some examples, the generation of predicted ephemeris data for potentially detectable satellites is to be performed before the generation of predicted ephemeris data for potentially undetectable satellites. In some examples, the generation of the predicted ephemeris data for potentially detectable satellites has higher priority with respect to obtaining computational resources of the position aware device 120. In some examples, the generation of the predicted ephemeris data for potentially undetectable satellites has lower priority with respect to obtaining computational resources of the position aware device 120, processed as a background process, or processed only when the position aware device 120 does not need to obtain position information. In some examples, the generation of the predicted ephemeris data for potentially undetectable satellites is avoided.

At S340, the predicted ephemeris for the potentially detectable satellites are generated based on the received ephemeris seed data according to the prioritization determined at S330. In some examples, the predicted ephemeris data for the potentially detectable satellites are generated before the position aware device 120 determines a position based on received satellite signals for the first time after the positioning functionality of the position aware device 120 is activated.

For example, the ephemeris prediction module 228 generates predicted ephemeris data for the potentially detectable satellites identified by the detectable satellite determination module 224 according to the prioritization performed by the ephemeris prioritization module 226.

At S350, another set of ephemeris seed data is received. In some examples, when the set of ephemeris seed data received at S310 is for less than the entire satellite constellation, the another set of ephemeris seed data received at S350 makes up to at least a portion of the deficiencies in the ephemeris seed data received at S310. In some examples, when the set of ephemeris seed data received at S310 is for the entire satellite constellation, S350 is omitted.

At S360, the predicted ephemeris for the potentially undetectable satellites are generated based on the ephemeris seed data received at S310 and/or at S350. In some examples, the predicted ephemeris data for the potentially undetectable satellites are generated after the position aware device 120 determines the position based on received satellite signals for the first time after the positioning functionality of the position aware device 120 is activated. In some examples, S360 is only performed as a low priority task or a background task.

In some examples, S350 and S360 are performed reclusively until the entire satellite constellation has corresponding valid predicted ephemeris data.

In some examples, the process 300 is only for the potentially visible satellites, and S350 and S360 are thus omitted.

After S360, or after S350 if S360 is omitted, or after S340 if S350 and S360 are omitted, the process 300 proceeds to S399 and terminates.

Figure 4A:
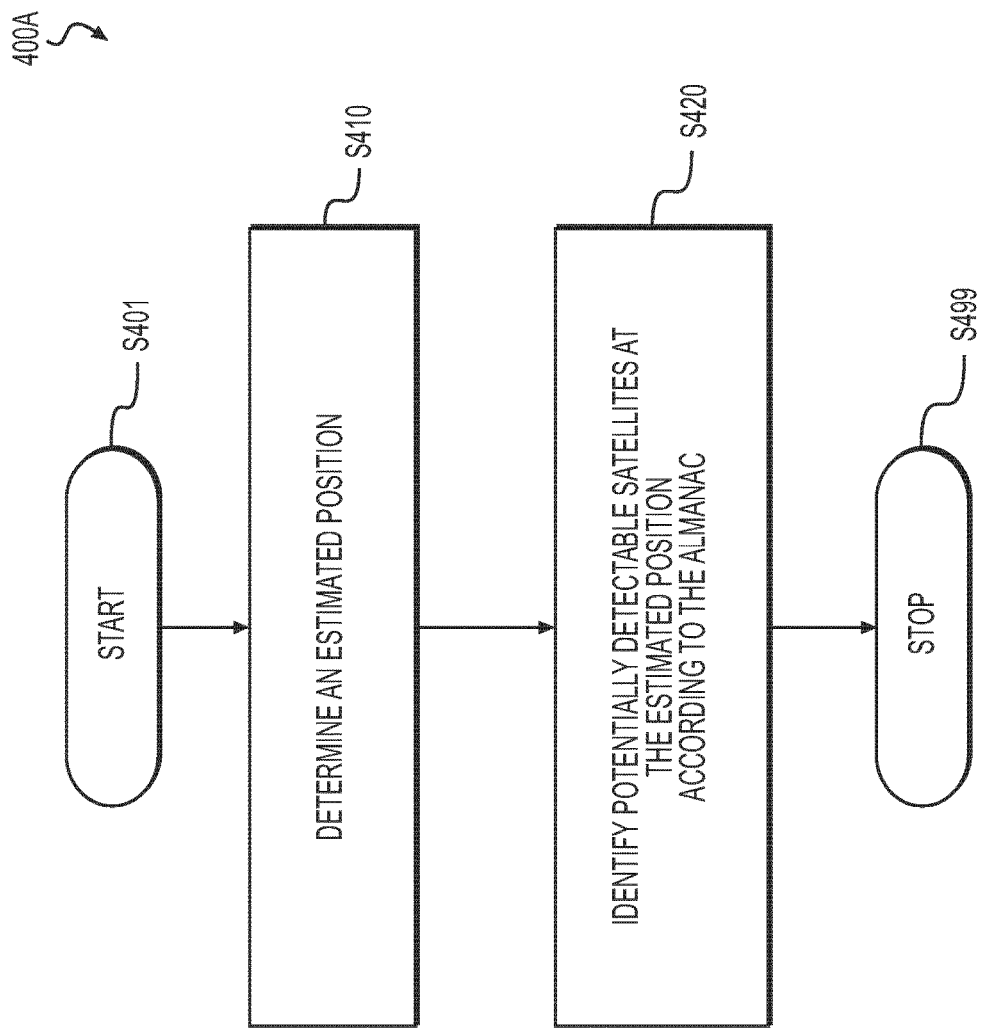
FIG. 4A shows a flow chart outlining an example process of identifying potentially detectable or undetectable satellites in FIG. 3 by the position aware device in FIG. 2 according to an embodiment of the disclosure.

FIG. 4A shows a flow chart outlining an example process 400A of identifying potentially detectable or undetectable satellites, such as S320 in FIG. 3, by a position aware device, such as the position aware device 120 in FIG. 2, according to an embodiment of the disclosure. It is understood that additional operations may be performed before, during, and/or after the process 400A depicted in FIG. 4A. The process 400A starts at S401 and proceeds to S410.

At S410, an estimated position is determined. In some examples, the estimated position is determined by a position aware device based on routing information of the position aware device in a data network. In some examples, the estimated position information is determined by the position aware device based on a previously stored known position and/or detection results of various movement sensors of the position aware device. For example, estimated position of the position aware device 120 is determined by the estimated position determination module 222 as described with reference to FIG. 2.

At S420, a set of potentially detectable satellites detectable at the estimated position at a given time is determined according to valid almanac data. For example, the potentially detectable and/or undetectable satellites are identified by the detectable satellite determination module 224 based on the estimated position determined by the estimated position determination module 222 as described with reference to FIG. 2.

After S420, the process 400A proceeds to S499 and terminates.

Figure 4B:
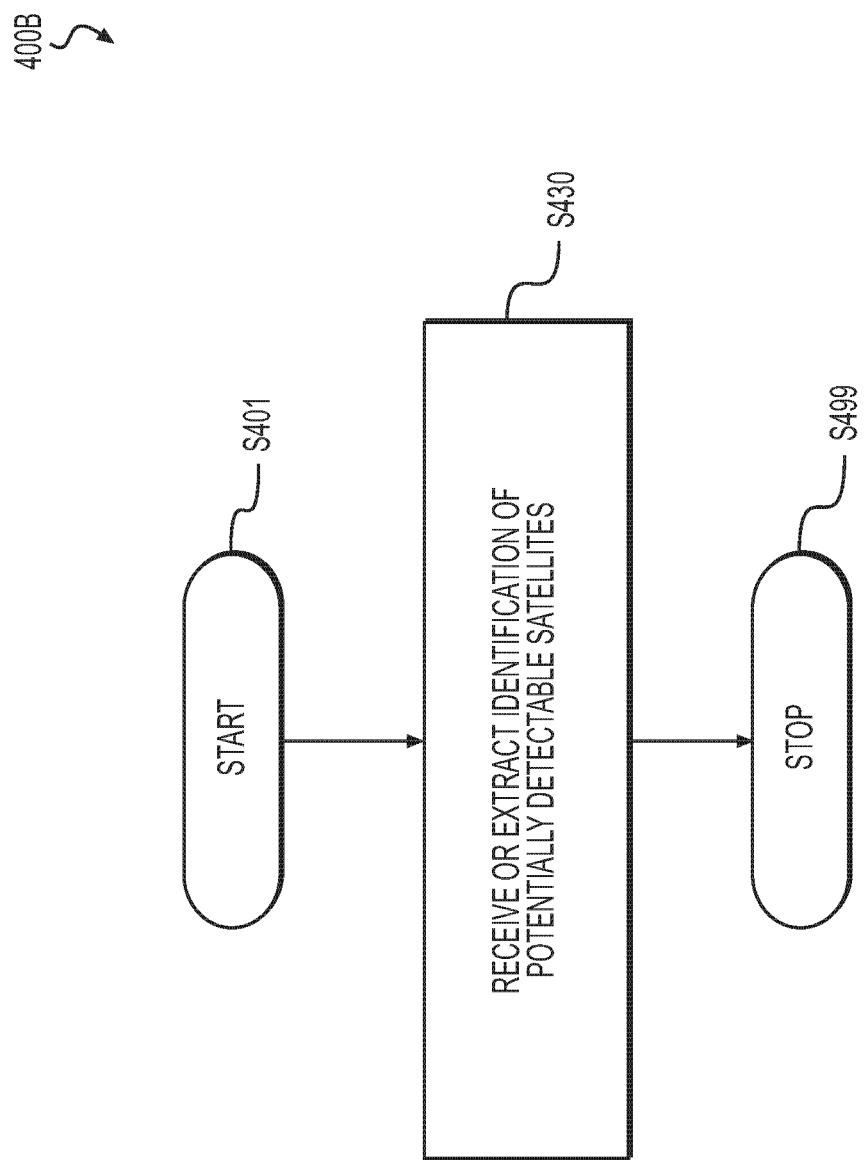
FIG. 4B shows a flow chart outlining another example process of identifying potentially detectable or undetectable satellites in FIG. 3 by the position aware device in FIG. 2 according to an embodiment of the disclosure.

FIG. 4B shows a flow chart outlining another example process 400B of identifying potentially detectable or undetectable satellites, such as S320 in FIG. 3, by a position aware, such as the position aware device 120 in FIG. 2, according to an embodiment of the disclosure. It is understood that additional operations may be performed before, during, and/or after the process 400B depicted in FIG. 4B. The process 400B starts at S401 and proceeds to S430.

At S430, a set of potentially detectable satellites detectable at the estimated position at the given time is determined according to information regarding potentially detectable satellites identified by an external device. In some examples, a server, in response to a request from a position aware device for ephemeris seed data, identifies potentially detectable satellites at an estimated position of the requesting position aware device. In some examples, the server provides the information of potentially detectable satellites to the position aware device in a form of a list of identification information of satellites. In some examples, the server incorporates the information of potentially detectable satellites in the ephemeris seed data to be transmitted to the requesting position aware device. For example, the potentially detectable and/or undetectable satellites are identified by the detectable satellite determination module 224 based on the information received from the server 130 as described with reference to FIG. 2.

After S430, the process 400B proceeds to S499 and terminates

Figure 5A:
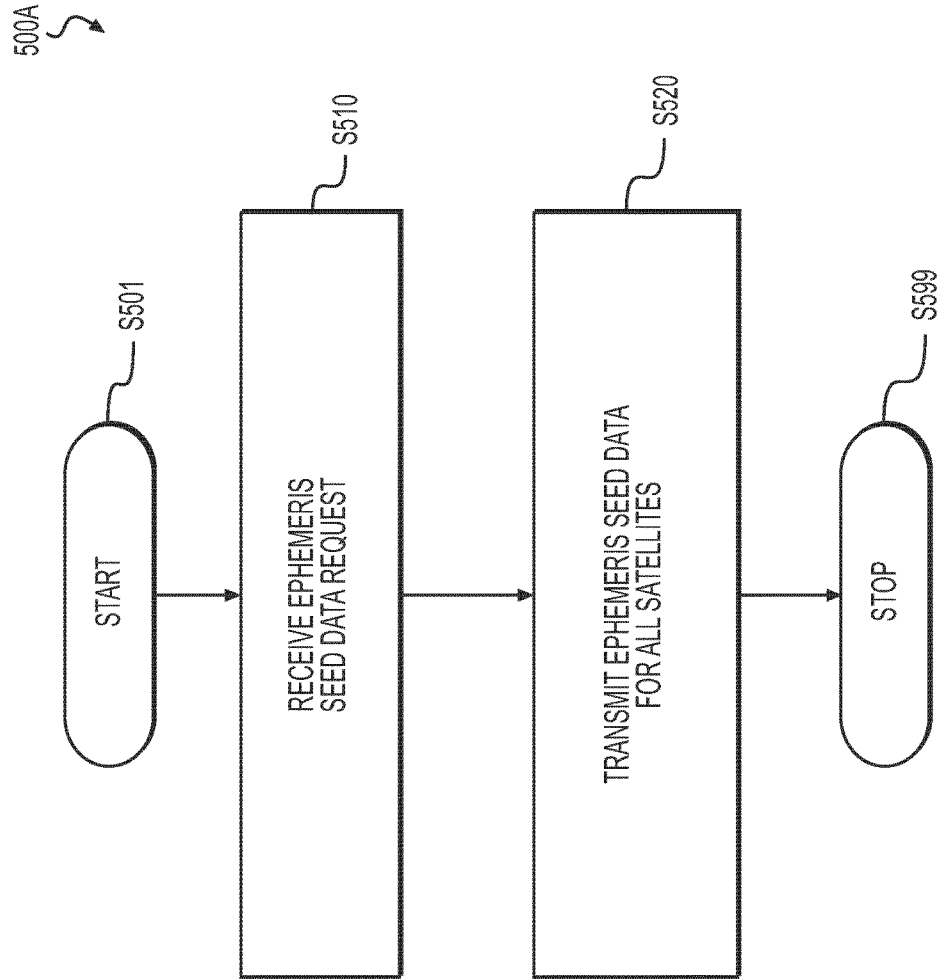
FIG. 5A shows a flow chart outlining an example process of providing ephemeris seed data by the server in FIG. 2 according to an embodiment of the disclosure.

FIG. 5A shows a flow chart outlining an example process 500A of providing ephemeris seed data by a server, such as the server 130 in FIG. 2, according to an embodiment of the disclosure. In some examples, the transmission of information according to the process 500A is to be received by a position aware device at S310 in FIG. 3. It is understood that additional operations may be performed before, during, and/or after the process 500A depicted in FIG. 5A. The process 500A starts at S501 and proceeds to S510.

At S510, a request for ephemeris seed data is received. For example, the request handling module 252 of the server 130 receives a request for ephemeris seed data from the position aware device 120 as described with reference to FIG. 2.

At S520, in response to the request for ephemeris seed data, ephemeris seed data for all satellites according to one or more predetermined GNSS standards are transmitted. For example, the request handling module 252 of the server 130 transmits the ephemeris seed data for the entire satellite constellation of applicable GNSS standards in response to the request for ephemeris seed data from the position aware device 120 as described with reference to FIG. 2.

After S520, the process 500A proceeds to S599 and terminates.

Figure 5B:
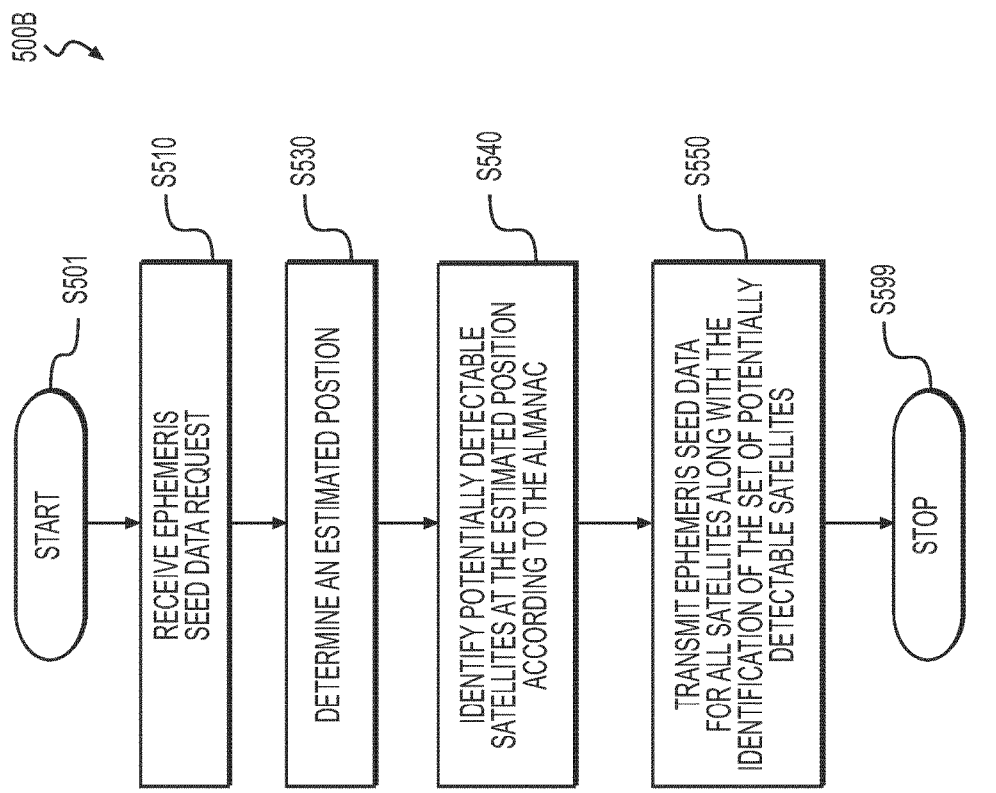
FIG. 5B shows a flow chart outlining an example process of providing ephemeris seed data and information regarding potentially detectable satellites by the server in FIG. 2 according to an embodiment of the disclosure.

FIG. 5B shows a flow chart outlining an example process 500B of providing ephemeris seed data and information regarding potentially detectable satellites by a server, such as the server 130 in FIG. 2, according to an embodiment of the disclosure. In some examples, the transmission of information according to the process 500B is to be received by a position aware device at S310 in FIG. 3. It is understood that additional operations may be performed before, during, and/or after the process 500B depicted in FIG. 5B. The process 500B starts at S501 and proceeds to S510.

At S510, a request for ephemeris seed data is received. For example, the request handling module 252 of the server 130 receives a request for ephemeris seed data from the position aware device 120 as described with reference to FIG. 2.

At S530, an estimated position of the requesting position aware device is determined. In some examples, the estimated position of the requesting position aware device is determined based on routing information associated with passing the request through the data network. In some examples, the routing information including information identifying an entry node for the requesting position aware device to access the data network. In some examples, the estimated position is determined based on a stored position of the entry node. For example, the estimated position of the position aware device 120 is determined by the estimated position determination module 254 as described with reference to FIG. 2.

At S540, a set of potentially detectable satellites at the estimated position is determined according to valid almanac data. For example, a set of potentially detectable satellites is determined by the detectable satellite determination module 256 as described with reference to FIG. 2.

At S550, in response to the request for ephemeris seed data, ephemeris seed data for all satellites according to one or more predetermined GNSS standards and a list of identification information of a set of identified potentially detectable satellites are transmitted. For example, the request handling module 252 of the server 130 transmits the ephemeris seed data for the entire satellite constellation of applicable GNSS standards and the list of identification information of detectable satellites in response to the request for ephemeris seed data from the position aware device 120 as described with reference to FIG. 2.

After S550, the process 500B proceeds to S599 and terminates.

Figure 5C:
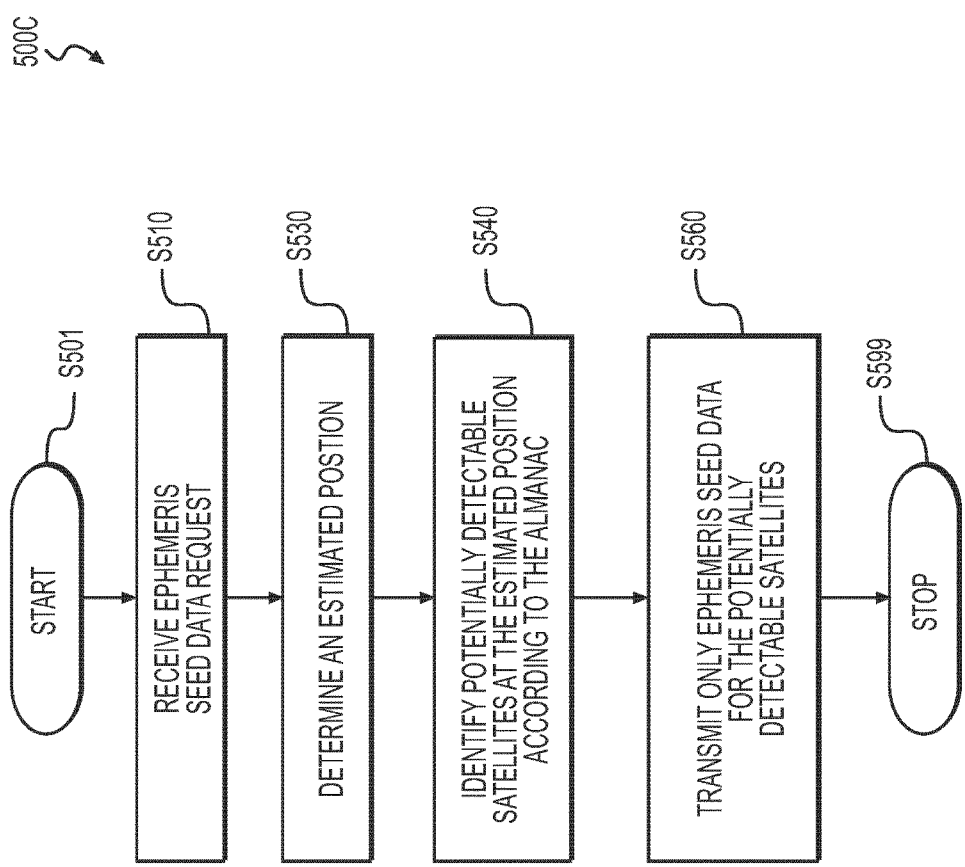
FIG. 5C shows a flow chart outlining an example process of providing ephemeris seed data embedded with information regarding potentially detectable satellites by the server in FIG. 2 according to an embodiment of the disclosure.

FIG. 5C shows a flow chart outlining an example process 500C of providing ephemeris seed data embedded with information regarding potentially detectable satellites by a server, such as the server 130 in FIG. 2, according to an embodiment of the disclosure. In some examples, the transmission of information according to the process 500C is to be received by a position aware device at S310 in FIG. 3. It is understood that additional operations may be performed before, during, and/or after the process 500C depicted in FIG. 5C. Also, components in FIG. 5C that are the same or similar to the components in FIG. 5B are given the same reference numbers, and detailed description thereof is omitted.

Compared with the process 500B, after S540, the process 500C proceeds to S560.

At S560, in response to the request for ephemeris seed data, the information regarding identified detectable satellites is embedded in the ephemeris seed data to be transmitted to the requesting position aware device. In some examples, at S560, only the ephemeris seed data of the set of detectable satellites identified at S540 are transmitted in response to the request. For example, the request handling module 252 of the server 130 transmits the ephemeris seed data for the identified detectable satellites in response to the request for ephemeris seed data from the position aware device 120 as described with reference to FIG. 2.

After S560, the process 500C proceeds to S599 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving, by a device through a data network, first ephemeris seed data of a subset of a plurality of satellites;
    identifying a first satellite and a second satellite of the plurality of satellites, the first satellite being potentially detectable by the device at an estimated position at a given time, and the second satellite being potentially undetectable by the device at the estimated position at the given time; and
    prioritizing generation of first predicted ephemeris data that represent a first orbit of the first satellite before generation of second predicted ephemeris data that represent a second orbit of the second satellite,
    the generation of the first predicted ephemeris being based on the first ephemeris seed data.

2. The method of claim 1, wherein
    the generation of the second predicted ephemeris data is based on the first ephemeris seed data.

3. The method of claim 1, further comprising:
    after the generation of the first predicted ephemeris data, receiving second ephemeris seed data of the second satellite,
    wherein the generation of the second predicted ephemeris data is based on the second ephemeris seed data.

4. The method of claim 1, wherein identifying the first satellite and the second satellite comprises:
    determining the estimated position based on routing information of the device in the data network; and
    identifying a set of potentially detectable satellites that are detectable to the device at the estimated position at the given time according to almanac data of the plurality of satellites.

5. The method of claim 4, wherein identifying the set of potentially detectable satellites comprises:
    identifying, among the plurality of satellites based on the estimated position and the almanac data, satellites that have elevation angles greater than a predetermined positive threshold as the set of potentially detectable satellites.

6. The method of claim 1, further comprising:
    receiving information indicating a set of potentially detectable satellites from a server outside the device,
    wherein identifying the first satellite and the second satellite is performed based on the information indicating the set of potentially detectable satellites.

7. The method of claim 1, wherein identifying the first satellite and the second satellite comprises identifying from the first ephemeris seed data the subset of the plurality of satellites as a set of potentially detectable satellites.

8. A device, comprising:
    a communication interface communicatively coupled to a network and configured to receive first ephemeris seed data of a subset of a plurality of satellites via the network; and
    a processor configured to:
        identify a first satellite and a second satellite of the plurality of satellites, the first satellite being potentially detectable by the device at an estimated position at a given time, and the second satellite being potentially undetectable by the device at the estimated position at the given time, and
        prioritize generation of first predicted ephemeris data that represent a first orbit of the first satellite before generation of second predicted ephemeris data that represent a second orbit of the second satellite,
        the generation of the first predicted ephemeris being based on the first ephemeris seed data.

9. The device of claim 8, wherein
    the generation of the second predicted ephemeris data is based on the first ephemeris seed data.

10. The device of claim 8, wherein
    the communication interface is further configured to, after the generation of the first predicted ephemeris data, receive second ephemeris seed data of the second satellite, and
    the generation of the second predicted ephemeris is based on the second ephemeris seed data.

11. The device of claim 8, wherein when identifying the first satellite and the second satellite, the processor is configured to:
    determine the estimated position based on routing information of the device in the data network, and
    identify a set of potentially detectable satellites detectable by the device at the estimated position at the given time according to almanac data of the plurality of satellites.

12. The device of claim 11, wherein when identifying the set of potentially detectable satellites, the processor is configured to:
    identify, among the plurality of satellites based on the estimated position and the almanac data, satellites that have elevation angles greater than a predetermined positive threshold as the set of potentially detectable satellites.

13. The device of claim 8, wherein
    the communication interface is further configured to receive information indicating a set of potentially detectable satellites from a server outside the device, and
    the processor is configured to identify the first satellite and the second satellite based on the information indicating the set of potentially detectable satellites.

14. The device of claim 8, wherein when identify the first satellite and the second satellite, the processor is further configured to identify from the first ephemeris seed data the subset of the plurality of satellites as a set of potentially detectable satellites.

15. A system, comprising:
    a server configured to store first ephemeris seed data of a subset of a plurality of satellites;
    a data network; and
    a device communicatively coupled with the server through the data network, the device being configured to
        receive first ephemeris seed data from the server via the data network,
        identify a first satellite and a second satellite of the plurality of satellites, the first satellite being potentially detectable by the device at an estimated position at a given time, and the second satellite being potentially undetectable by the device at the estimated position at the given time, and
        prioritize generation of first predicted ephemeris data that represent a first orbit of the first satellite before generation of second predicted ephemeris data that represent a second orbit of the second satellite,
the generation of the first predicted ephemeris being based on the first ephemeris seed data.

16. The system of claim 15, wherein
the generation of the second predicted ephemeris data is based on the first ephemeris seed data.

17. The system of claim 16, wherein
the server is further configured to store second ephemeris seed data of the second satellite,
the device is further configured to receive the second ephemeris seed data after the generation of the first predicted ephemeris, and
the generation of the second predicted ephemeris data is based on the second ephemeris seed data.

18. The system of claim 15, wherein when identifying the first satellite and the second satellite, the device is further configured to:
determine the estimated position based on routing information of the device in the data network, and
identify a set of potentially detectable satellites detectable by the device at the estimated position at the given time according to almanac data of the plurality of satellites.

19. The system of claim 15, wherein the server is further configured to
determine the estimated position based on routing information of the device in the data network, and
identify a set of potentially detectable satellites detectable by the device at the estimated position at the given time according to almanac data of the plurality of satellites.

20. The system of claim 19, wherein when identifying the set of potentially detectable satellites, the server is further configured to
identify, among the plurality of satellites based on the estimated position and the almanac data, satellites that have elevation angles greater than a predetermined positive threshold as the set of potentially detectable satellites.

\* \* \* \* \*